United States Patent
McNaney

[11] 3,725,910
[45] Apr. 3, 1973

[54] ELECTRICALLY CONTROLLABLE LIGHT REFLECTING CELL AND MEANS FOR UTILIZATION ON A CHARACTER PRESENTATION DEVICE

[76] Inventor: Joseph T. McNaney, 8548 Boulder Drive, La Mesa, Calif. 92041

[22] Filed: June 18, 1971

[21] Appl. No.: 154,298

[52] U.S. Cl............340/378 R, 340/324 R, 340/336, 340/366 R, 350/160 R, 350/267
[51] Int. Cl...............................................G08b 5/36
[58] Field of Search.......350/160 R, 267; 340/324 R, 340/336, 366 R, 378 R

[56] References Cited

UNITED STATES PATENTS

| | | | |
|---|---|---|---|
| 2,915,943 | 12/1959 | Brown et al. | 350/160 R X |
| 3,278,749 | 10/1966 | Seidel | 350/160 R X |
| 3,360,324 | 12/1967 | Hora | 350/160 R |
| 3,476,460 | 11/1969 | Hansen et al. | 350/160 R |
| 3,535,022 | 10/1970 | Duchateau et al. | 350/160 R |
| 3,581,308 | 11/1971 | McNaney | 340/336 X |

*Primary Examiner*—David L. Trafton

[57] ABSTRACT

Specified herein is an informational character presentation device utilizing electrically controllable light reflecting cells for allowing light from a common source of light to be converted into an array of light emitting areas on the viewing surface of the device, each area representing a segment with which one or more message characters may be formed. Various embodiments of the light reflecting cell are included in the disclosure, each embodying the principles of a light guide utilizing a series of internal light reflections for the transmission of light to the emitting area thereof.

15 Claims, 7 Drawing Figures

PATENTED APR 3 1973    3,725,910
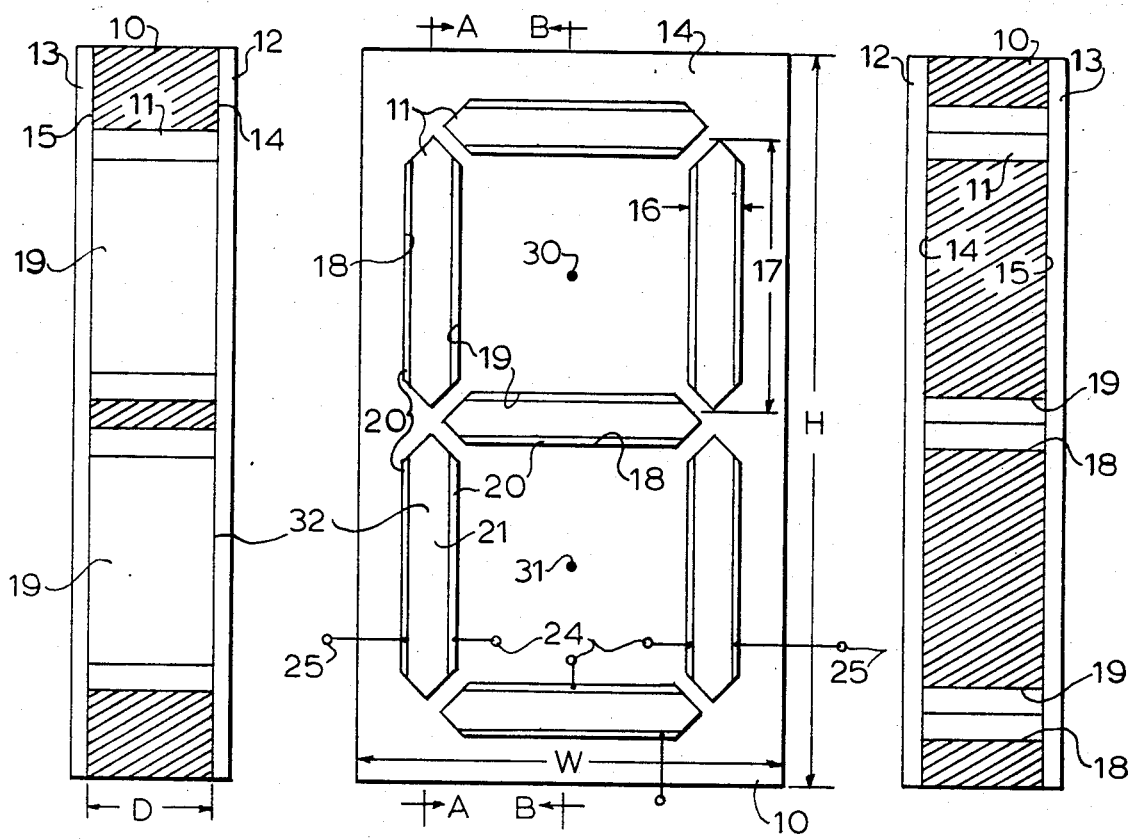
FIG. 2    FIG. 1    FIG. 3
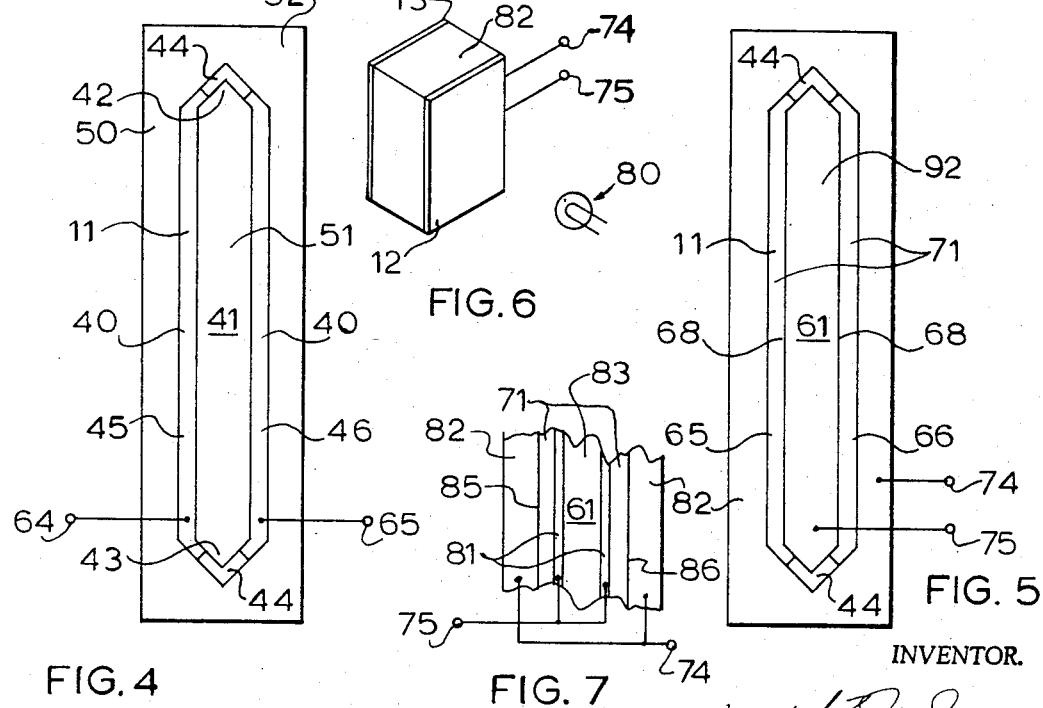
FIG. 4    FIG. 6    FIG. 5
FIG. 7
INVENTOR.
Joseph P. McHaney

ELECTRICALLY CONTROLLABLE LIGHT REFLECTING CELL AND MEANS FOR UTILIZATION ON A CHARACTER PRESENTATION DEVICE

SUMMARY OF THE INVENTION

Each of the electrically controllable light reflecting cells in the various embodiments of the invention make use of a particular assembly of materials for effecting the reflection of light from a light admitting surface to a light emitting surface thereof. And in each case an electrical field is applied to an assembly for establishing opposing indices of refraction at an interface of two or more materials therein so as to control the transmission of light through a cell as a function of the potential to which it is subjected. More importantly, it is an object of this invention to provide assemblies meeting such light transmission requirements which are also capable of meeting the low cost requirements of the character presentation device in which they may be used. It is therefore an object of this invention to provide a device that will function more efficiently and cost less to produce than presently known display units, such as those comprised of light emitting diodes, light emitting phosphors, plasma cells, gas discharge tubes, and the like.

Another object of this invention is to utilize a sandwich of materials in each cellular type embodiment thereof which depends on a solid and a liquid, or fluid, interface of the two materials at which index of refraction differentials are established for controlling the reflection of light thereat. The cells of the type herein specified are, of course, designed to simplify the fabrication of the character forming device of the invention.

BRIEF DESCRIPTION OF THE DRAWING

Important features and further objects of the invention will, of course, be understood when described herein in view of the following details of the drawing, wherein:

FIG. 1 is a plan view of a member of a character display device in which a predetermined array of light reflection control cells are supported;

FIG. 2 shows a section through A—A of FIG. 1;

FIG. 3 shows a section through B—B of FIG. 1;

FIG. 4 is a surface view of a particular light reflection cell embodiment of the invention;

FIG. 5 is a surface view of still another light reflection cell embodiment of the invention; and FIG. 7 is a detail thereof;

FIG. 6 is a simplified diagram of a display device of the invention.

DESCRIPTION OF PREFERRED EMBODIMENTS

In FIG. 1 a character presentation device of this invention will be described as having a light reflection control cell support member 10 having therein an array of openings 11, through a depth dimension thereof, so as to represent a figure eight of well known seven segment display devices. Although shown to be many times larger than typical display devices of the type to which this invention relates, the W to H aspect ratio of that illustrated is somewhat typical. In the sections A—A and B—B shown, respectively, in FIGS. 2 and 3 the openings 11 are shown to extend through a depth dimension D of the support member 10, and in these showings of the device there is a plastic light transparent plate, for example, such as plate 12 and plate 13, on opposite surfaces 14 and 15 of the member 10. Referring now, and more particularly, to the openings 11, each of them will be designed to have contained therein one of the light reflection control cells of the invention. The one cross sectional dimension 16 can be understood as being 0.020 inch, the other extreme dimension 17 may be ten times this figure, or 0.2 inch, and the depth D may be 20 times the figure, or 0.4 inch. These dimensions are, of course, examples of any size considerations regarding the cells of this invention.

Adjacent the two walls 18 and 19 of each of the openings 11 there is a relatively thin layer 20 of light transparent, electrically conductive, material and the space intermediate these layers 20, extending from the surface 14 to the surface 15, is filled with an electro-optic light conducting material 21. The layers 20 will be of a material such as "NESA" transparent conductive material, or of glass or plastic made sufficiently electrically and optically conductive to satisfy the operational requirements of the invention. The material 21 may be selected from such electro-optic materials as nitrobenzene, carbon disulphide, carbon bisulfide, bentonite colloid, or such other liquid, gas or colloidal material, each presenting a predetermined index of refraction and one which will be raised or lowered under the influence of an electric potential field.

Each of the layers 20 will function as electrodes having terminals 24 and 25 whereby a potential field can be applied to the material 21. Either under the influence of an electrical potential field, or in the absence of such field, the combination of the two materials 20 and 21 selected will permit light to be transmitted from a light admitting surface to a light emitting surface thereof, by means of a series of internal reflections at the interface of these materials on opposite sides of the material 21. These reflections occur by virtue of the material 20 having a lower index of refraction than the material 21, whether or not such index differential has been established in the presence of a potential field. However, changes in such index differentials will be effected in accordance with changes in the potential of the field. Index differentials may be controlled to the extent of varying the numerical aperture over a range extending from the greatest angle at which a meridional ray can be accepted for transmission through the material 21 to zero. At a zero acceptance angle, or under conditions when the index of the layers 20 is higher than that of the material 21, light rays of any angle will be conducted through the layers 20 to the member 10 material where they are then absorbed, or they can be absorbed in the material of the layers 20. In order to avoid the possibility of light passing through the material 21 at, for example, zero transmission angle the source of light for the illumination of the device can originate at or about points 30 and 31, whereby any light ray therefrom entering a light admitting surface of any of the cells of the device will be transmitted through the material 21 after undergoing a series of reflections at the interfaces of the sandwich of materials. Depending upon the distance at which substantially point sources of light are supported in relation to the surface 14 of the device the angles at which light can be transmitted can be advantageously limited. Under these circumstances a relatively narrow range of potential field changes will be required to effect desired light cell functions. For example, if parallel rays of light incident upon a light admitting surface 32 is at 45°, and within the acceptance angle of the numerical aperture of the cell, the index differential at the interface of the materials 20 and 21 can be decreased to where the acceptance angle is just less than 45° so as to frustrate the reflection of light to the light emitting surface of the cell. This could involve but a relatively small index differential change, and an equally small potential field change, in effecting an on-off function of the cell.

The discussion of the invention thus far concerned the use of a cell comprised of a fluid, liquid or colloid type material sandwiched between a pair of light conducting electrodes 20. The space between the electrodes, in the opening 11 of the support member 10, and between windows 12 and 13, serves as a receptacle for holding the material 21. In a further embodiment of the invention the electro-optic material 41, as shown in FIG. 4, is of a solid material sandwiched between a pair of electrodes 40 on opposite sides thereof which are in the nature of a fluid, liquid of colloid material. The light conducting member 41, prior to being placed in the opening 11 of a support member 50, is initially formed so as to have an overall configuration similar to that given the material 21. The member 41 may be comprised of an electro-optic material such as KDP, barium sodium niobate, lead lanthanum zirconate, or such other ferroelectric ceramics or material which will provide a change in the index of refraction thereof when subjected to the influence of a potential field. When placed in a member 50, the layer 41 will be supported at opposite ends thereof 42 and 43 by means of a spacer 44 made of rubber, plastic or the like, so as to provide individual spaces, or small compartments, 45 and 46 on opposite sides thereof. The member 41 presents a light admitting surface 51 and a light emitting surface (not shown) on an opposite end thereof. The surfaces 51 and 52 will have a face plate joined thereto, and on the opposing surfaces thereof, similar to plates 12 and 13 in the FIG. 1 embodiment. The individually sealed spaces 45 and 46 will support therein a pair of electrodes 40 connected, respectively, to terminals 64 and 65 whereby the layer 41 may be subjected to the influence of a potential applied thereto. The spaces 45 and 46 may be filled with a liquid, such as water, capable of establishing a light reflecting interface with the material 41 and capable of functioning as the electrodes 40 in the cell. The cell of this embodiment may be utilized in a character display device, and operated in a manner, similar to the cells described in the FIG. 1 embodiment.

In still another embodiment of the invention, shown in FIG. 5, a member 61 having a configuration similar to that of the member 41, functions as one of the electrodes of the light reflection control cell, but insensitive to electrical fields being applied to the cell. The member 61 is also the principal light conductor of the cell. On opposing sides of the light conductor 61, spaces 65 and 66 have therein an electro-optic material 71 similar to the material 21 of the FIG. 1 embodiment. The member 61 may be composed of a light conductive material made sufficiently electrically conductive to satisfy operational requirements of the invention. Or, as shown in FIG. 7, the member 61 is preferably composed of a light conducting material 83, such as glass, having deposited on outer surfaces 68 thereof a layer of light transparent, electrically conducting, material 81, such as "NESA" transparent conductive material. The glass portion 83 will have an index of refraction which matches, or is in predetermined limits of matching, the index of refraction of the transparent material of the layer 81. Unlike the support members 10 and 50 shown in the FIGS. 1 and 4 embodiments, which are electrically resistive, the member 82 is electrically conductive. However, neither of these members are of a light conducting material but are each capable of absorbing light that is conducted thereto from an adjacent light conducting layer of a cell. The member 82 will function as an electrode of a cell. As shown in FIG. 7, portions of the member 82 will function as electrodes on two sides of a cell having the light conducting member 61 at a mid-point thereof. A first layer of the transparent conductive material 81 is sandwiched between the member 61 glass portion 83 and a layer of electro-optic material 71 on the one side of the cell, and a second layer of the transparent conductive material 81 is sandwiched between the glass portion 83 and a layer of electro-optic material 71 on the other side of the cell. This combination of the materials 71, 81 and 83 are also shown sandwiched between those portions of the member 82 that will function as electrodes on the two sides of the cell.

In operation, control voltages will be connected to terminals 74 and 75 and, respectively, to the electrodes 82 and the layers 81 also serving as electrodes. Very favorable aspects of the FIGS. 5 and 7 cell embodiments are that a relatively small thickness dimension, 0.001 inch for example, of electrically controllable light reflecting material 71 will allow the cell to respond to a correspondingly lower order of operating potentials, and independent of the thickness dimension of the light conducting member 61. Depending upon the material selected for use as the layers 71, under the influence of a potential field, the index of refraction thereof will either be raised or lowered from a predetermined initial index. Either under the influence of an electrical potential field, or in the absence of such a field, the combination of the materials 71, 81 and 83 selected will permit light to be transmitted from a light admitting surface to a light emitting surface of the member 61 by means of a series of reflections within the cell. These reflections occur by reason of the fact that the layers 71 have a lower index of refraction than that of the layers 81, whether or not such index differential has been established in the presence of a potential field.

Cells in accordance with the FIGS. 5 and 7 embodiments may be used in display devices like that described in connection with the FIG. 1 embodiment, but using any number of character forming segments desired, and a light source 80 as shown in FIG. 6. As noted in the discussion of the initial embodiment of the invention, index differentials of a cell will be controlled in accordance with changes in the applied potential field and may be controlled to the extend of varying the numerical aperture over a wide range. However, as indicated, it has been found desirable to utilize light rays incident upon the surface 92 at, or within a range close to, 45°. In doing so the index of the layer 81 may be higher or lower, within a predetermined range, than the glass 83 of the member 61, whereby light will be conducted to the interface of materials 71 and 81, reflected thereat, then conducted from the material 81 to the material 83 through the interface thereof, and toward the emitting end of the cell. The reflection of light at either of these interfaces 71-81 and 81-83 would be frustrated at the operating acceptance angles of the cell.

The particular embodiments of the invention described herein are illustrative only. Therefore, the invention includes such other modifications and equivalents as may be seen by those skilled in the arts, but still being within the scope of the appended claims.

I claim:

1. An electrically controllable light reflecting cell for use in an informational character presentation means, comprising:
   a. first, second and third light conductors presenting, respectively, first, second and third indices of refraction;
   b. said first light conductor having a predetermined cross sectional dimension, a first end through which light is admitted thereto, a second end through which light is emitted therefrom, a longitudinal dimension in the direction of the passage of light between said ends, and first and second surfaces on opposing sides thereof along said longitudinal dimension;
   c. said second light conductor having a predetermined thickness dimension, a longitudinal dimension in the direction of said passage of light, first and second surfaces on opposing sides thereof along said longitudinal dimension, said first surface thereof supported adjacent the first surface of said first conductor so as to effect a first interface of said first and second conductors along said longitudinal dimension, said first and second indices of refraction being coincident with said first interface and presenting a first index differential thereat;
   d. said third light conductor having a predetermined thickness dimension, a longitudinal dimension in the direction of said passage of light, first and second surfaces on opposing sides thereof along said longitudinal dimension, said second surface thereof supported adjacent the second surface of said first conductor so as to effect a second interface of said first and third conductors along said longitudinal dimension, said first and third indices of refraction being coincident with said second interface and presenting a second index differential thereat;
   e. means for applying a potential field between said first interface and said second interface for effecting a change in said first and second index differentials and controlling accordingly reflections of light from said first end to said second end;
   f. said change in the first and second index differentials being substantially proportional to a change in said predetermined index of said first light conductor;
   g. said second and third light conductors each including an electrically conductive material for extending, respectively, the potential of said field to said first and to said second interfaces.

2. An electrically controllable light reflecting cell for use in an informational character presentation means, comprising:
   a. first, second and third light conductors presenting, respectively, first, second and third indices of refraction;
   b. said first light conductor having a predetermined cross sectional dimension, a first end through which light is admitted thereto, a second end through which light is emitted therefrom, a longitudinal dimension in the direction of the passage of light between said ends, and first and second surfaces on opposing sides thereof along said longitudinal dimension;
   c. said second light conductor having a predetermined thickness dimension, a longitudinal dimension in the direction of said passage of light, first and second surfaces on opposing sides thereof along said longitudinal dimension, said first surface thereof supported adjacent the first surface of said first conductor so as to effect a first interface of said first and second conductors along said longitudinal dimension, said first and second indices of refraction being coincident with said first interface and presenting a first index differential thereat;
   d. said third light conductor having a predetermined thickness dimension, a longitudinal dimension in the direction of said passage of light, first and second surfaces on opposing sides thereof along said longitudinal dimension, said second surface thereof supported adjacent the second surface of said first conductor so as to effect a second interface of said first and third conductors along said longitudinal dimension, said first and third indices of refraction being coincident with said second interface and presenting a second index differential thereat;
   e. means for applying a potential field between said first interface and the second surface of said second light conductor and between said second interface and the first surface of said third light conductor for effecting a change in said first and second index differentials and controlling accordingly reflections of light from said first end to said second end;
   f. said change in the first and second index differentials being substantially proportional to a change in said predetermined index of the second light conductor and to a change in said predetermined index of the third light conductor, respectively;
   g. said first light conductor including an electrically conductive material for extending, respectively, the potential of said field to said first and to said second interfaces.

3. An electrically controllable light reflecting cell for use in an informational character presentation means, comprising:
   a. first, second and third light conductors presenting, respectively, first, second and third indices of refraction;

b. said first light conductor having a predetermined cross sectional dimension, a first end through which light is admitted thereto, a second end through which light is emitted therefrom, a longitudinal dimension in the direction of the passage of light between said ends, and first and second surfaces on opposing sides thereof along said longitudinal dimension;

c. said second light conductor having a predetermined thickness dimension, a longitudinal dimension in the direction of said passage of light, first and second surfaces on opposing sides thereof along said longitudinal dimension, said first surface thereof being closely adjacent the first surface of said first conductor;

d. said third light conductor having a predetermined thickness dimension, a longitudinal dimension in the direction of said passage of light, first and second surfaces on opposing sides thereof along said longitudinal dimension, said second surface thereof being closely adjacent the second surface of said first conductor;

e. first and second layers of light transparent electrically conductive material, each presenting a predetermined index of refraction and having a thickness dimension;

f. said first layer sandwiched between the first surface of said first conductor and the first surface of said second conductor and intimately joined therewith so as to effect a first interface of said first and second conductors which includes said thickness of the first layer, said interface being along said longitudinal dimension, and said first and second indices of refraction being adjacent said first interface and presenting a first index differential thereat;

g. said second layer sandwiched between the second surface of said first conductor and the second surface of said third conductor and intimately joined therewith so as to effect a second interface of said first and third conductors which includes said thickness of the second layer, said interface being along said longitudinal dimension, and said first and third indices of refraction being adjacent said second interface and presenting a second index differential thereat;

h. an electrode means adjacent the second surface of said second conductor and adjacent the first surface of said third conductor;

i. means for applying a potential field between said first layer and said electrode means adjacent said second conductor and between said second layer and said electrode means adjacent said third conductor for effecting a change in said first and second index differentials and controlling accordingly reflections of light from said first end to said second end of said light reflecting cell.

4. An electrically controllable light reflecting cell for use in information presentation means, comprising:

a. first and second electrodes;

b. means for applying a potential field between said electrodes;

c. said electrodes positioned at, and facing each other on, opposite sides of said cell so as to provide intermediate said electrodes a space extending along a dimension thereof in the direction of the passage of light from a light admitting end to a light emitting end of said cell;

d. light conducting material sandwiched between said electrodes in said space having a predetermined cross sectional dimension transverse of said direction of the passage of light through said cell, presenting an electrically controllable index of refraction and presenting at least first and second indices of refraction which are effected in accordance with said applying of a potential field between said electrodes;

e. said electrodes intimately joined with said light conducting material along said dimension thereof, each including a light conducting material presenting an index of refraction which is lower than said first index of refraction and higher than said second index of refraction.

5. The invention as set forth in claim 4 additionally including:

f. said light conducting material comprising a fluid.

6. The invention as set forth in claim 4 additionally including:

f. said first and second electrodes comprising a fluid.

7. The invention as set forth in claim 4 additionally including:

f. a plurality of said cells supported in an array wherein said light emitting end of each cell is representative of one, or a number of different, message character forming segments.

8. The invention as set forth in claim 1 additionally including:

h. said second and third light conductors each including an electrically conducting material for effecting said applying of a potential field between said first interface and said second interface.

9. The invention as set forth in claim 1 additionally including:

h. said first light conductor being comprised of a fluid material.

10. The invention as set forth in claim 1 additionally including:

h. said second and third light conductors each being comprised of a fluid material.

11. The invention as set forth in claim 1 additionally including:

h. a plurality of said cells supported in an array wherein said second end of each said first light conductor represents one, or a number of different, informational character forming segments.

12. The invention as set forth in claim 2 additionally including:

h. said second and third light conductors each being comprised of an electrically controllable index of refraction fluid material.

13. The invention as set forth in claim 2 additionally including:

h. a plurality of said cells supported in an array wherein said second end of each said first light conductor represents one, or a number of different, informational character forming segments.

14. The invention as set forth in claim 3 additionally including:

j. said second and third light conductors each being comprised of an electrically controllable index of refraction fluid material.

15. An electrically controllable light reflecting cell for use in information presentation means, comprising:

a. first, second and third light conductors presenting, respectively, first, second and third indices of refraction;

b. said first light conductor having a predetermined cross sectional dimension, a first end through which light is admitted thereto, a second end through which light is emitted therefrom, a longitudinal dimension in the direction of the passage of light between said ends, and first and second surfaces on opposing sides thereof along said longitudinal dimension;

c. said second light conductor having a predetermined thickness dimension, a longitudinal dimension in the direction of said passage of light, first and second surfaces on opposing sides thereof along said longitudinal dimension, said first surface thereof supported adjacent the first surface of said first conductor so as to effect a first interface of said first and second conductors along said longitudinal dimension, said first and second indices of refraction being coincident with said first interface and presenting a first index differential thereat;

d. said third light conductor having a predetermined thickness dimension, a longitudinal dimension in the direction of said passage of light, first and second surfaces on opposing sides thereof along said longitudinal dimension, said second surface thereof supported adjacent the second surface of said first conductor so as to effect a second interface of said first and third conductors along said longitudinal dimension, said first and third indices of refraction being coincident with said second interface and presenting a second index differential thereat;

e. first and second electrode means for applying a potential field between said first interface and the second surface of said second light conductor and between said second interface and the first surface of said third light conductor for extending, respectively, the potential of said field to said first and to said second interfaces and for effecting a change in said first and second index differentials and controlling accordingly reflections of light from said first end to said second end.

* * * * *